US006985889B1

(12) United States Patent
Tapio et al.

(10) Patent No.: US 6,985,889 B1
(45) Date of Patent: Jan. 10, 2006

(54) SYSTEM AND METHOD FOR SHARING OF EXPERT KNOWLEDGE

(75) Inventors: Thomas H. Tapio, Deerfield, IL (US); Daniel M. Schramm, Chicago, IL (US)

(73) Assignee: Topiary Communications, Inc., Chicago, IL (US)

( * ) Notice: Subject to any disclaimer, the term of this patent is extended or adjusted under 35 U.S.C. 154(b) by 633 days.

(21) Appl. No.: 09/678,428

(22) Filed: Oct. 2, 2000

Related U.S. Application Data

(60) Provisional application No. 60/156,838, filed on Sep. 30, 1999.

(51) Int. Cl.
*G06F 15/18* (2006.01)

(52) U.S. Cl. ........................................................ 706/45
(58) Field of Classification Search ................... 706/60
See application file for complete search history.

(56) References Cited

U.S. PATENT DOCUMENTS

| | | | |
|---|---|---|---|
| 4,658,370 A * | 4/1987 | Erman et al. ................. | 706/60 |
| 4,731,725 A | 3/1988 | Suto et al. .................... | 706/46 |
| 4,733,354 A | 3/1988 | Potter et al. ................. | 600/300 |
| 4,764,867 A | 8/1988 | Hess ........................... | 345/853 |
| 4,803,641 A | 2/1989 | Hardy et al. .................. | 706/60 |
| 4,847,784 A | 7/1989 | Clancey ....................... | 706/50 |
| 4,920,499 A | 4/1990 | Skeirik ........................ | 706/11 |
| 4,945,476 A | 7/1990 | Bodick et al. ............... | 600/301 |
| 4,964,125 A | 10/1990 | Kim ............................ | 714/26 |
| 5,103,498 A | 4/1992 | Lanier et al. ................. | 706/58 |
| 5,107,497 A | 4/1992 | Lirov et al. ................... | 714/26 |
| 5,127,005 A | 6/1992 | Oda et al. ..................... | 714/26 |
| 5,208,745 A | 5/1993 | Quentin et al. ............... | 700/83 |
| 5,211,563 A | 5/1993 | Haga et al. ................... | 434/322 |
| 5,257,185 A * | 10/1993 | Farley et al. ................. | 707/100 |
| 5,267,685 A | 12/1993 | Sorensen ..................... | 206/503 |
| 5,295,230 A | 3/1994 | Kung ........................... | 706/59 |
| 5,311,422 A | 5/1994 | Loftin et al. .................. | 703/2 |
| 5,333,237 A | 7/1994 | Stefanopoulos et al. ...... | 706/11 |
| 5,344,326 A | 9/1994 | Ferris .......................... | 434/336 |
| 5,359,701 A | 10/1994 | Fukui et al. .................. | 706/53 |
| 5,441,415 A | 8/1995 | Lee et al. ..................... | 434/350 |
| 5,539,869 A | 7/1996 | Spoto et al. ................. | 715/800.1 |
| 5,546,507 A | 8/1996 | Staub .......................... | 706/60 |
| 5,576,844 A | 11/1996 | Anderson et al. ............. | 386/52 |
| 5,577,186 A | 11/1996 | Mann, II et al. ............ | 715/501.1 |
| 5,644,686 A | 7/1997 | Hekmatpour ................ | 706/45 |
| 5,673,369 A | 9/1997 | Kim ............................ | 706/59 |

(Continued)

FOREIGN PATENT DOCUMENTS

EP    0 915 422 A1    5/1999

OTHER PUBLICATIONS

Elastic model-based segmentation of 3-D neuroradiological data sets Kelemen, A.; Szekely, G.; Gerig, G.; Medical Imaging, IEEE Transactions on vol. 18, Issue 10, Oct. 1999 Page(s):828-839 □□.*

(Continued)

*Primary Examiner*—Anthony Knight
*Assistant Examiner*—Michael B. Holmes
(74) *Attorney, Agent, or Firm*—Wallenstein Wagner & Rockey, Ltd.

(57) ABSTRACT

The present invention provides a system and method of creating electronic files for solving a problem for a learner from the knowledge of an expert comprising the steps of receiving the expert's knowledge in an area of expertise, providing a template for the electronic files and generating the electronic files from the expert's knowledge and the template.

33 Claims, 16 Drawing Sheets

U.S. PATENT DOCUMENTS

| | | | |
|---|---|---|---|
| 5,696,885 A | | 12/1997 | Hekmatpour ................. 706/59 |
| 5,788,508 A | | 8/1998 | Lee et al. .................... 434/350 |
| 5,799,292 A | | 8/1998 | Hekmatpour ................. 706/11 |
| 5,806,056 A | | 9/1998 | Hekmatpour ................. 706/50 |
| 5,835,683 A | | 11/1998 | Corella et al. ................. 706/59 |
| 5,870,768 A | | 2/1999 | Hekmatpour ............. 715/501.1 |
| 5,947,747 A | * | 9/1999 | Walker et al. ............... 434/354 |
| 5,987,443 A | * | 11/1999 | Nichols et al. ............... 706/11 |
| 6,018,732 A | * | 1/2000 | Bertrand et al. .............. 706/60 |
| 6,026,433 A | | 2/2000 | D'Arlach et al. ........... 709/217 |
| 6,029,159 A | | 2/2000 | Zorba et al. ................... 706/47 |
| 6,064,998 A | * | 5/2000 | Zabloudil et al. ............. 706/45 |
| 6,128,655 A | * | 10/2000 | Fields et al. ................. 709/219 |

OTHER PUBLICATIONS

The DBG message understanding system Montgomery, C.A.; Burge, J.; Holmback, H.; Kuhns, J.L.; Stalls, B.G.; Stumberger, R.; Russel, R.L.; AI Systems in Government Conference, 1989.,Proceedings of the Annual Mar. 27-31, 1989 Page(s):258-265.*

Authoring system for the development of ITS Kyungseob Yoon; Changjong Wang; TENCON '94. IEEE Region 10's Ninth Annual International Conference. Theme: 'Frontiers of Computer Technology'. Proceedings of 1994 Aug. 22-26, 1994 Page(s):97-101 vol. 1.*

Speaking the users' languages Isard, A.; Oberlander, J.; Matheson, C.; Androutsopoulos, I.; Intelligent Systems, IEEE [see also IEEE Intelligent Systems and Their Applications] vol. 18, Issue 1, Jan.-Feb. 2003 Page(s):40-45.*

Automatic analog circuit test strategist: the application of artificial intelligence to the generation of ATE softwareMarinelli, L.; Small, R.; IEEE Automatic Testing Conference. Sep. 25-28, 1989 Page(s):132-137.*

Decision support system for substation operation Dabbaghchi, I.; Gursky, R.J.; Power Industry Computer Application Conference, 1989. PICA '89, Conference Papers May 1-5, 1989 Page(s):141-147.*

* cited by examiner

/-112

Question Dialog - Also Hooking

Question
- Question Name: Also Hooking
- Question Abbr: Also Hooking
- Instruction Text: Determine if your shots are hooking:
- Question Text: Are your well-hit shots hooking to your left?

Show

Responses
- Response Text:
- ↑ ↓ [Insert] [Replace] [Remove]
- Responses: No / Yes / Not Sure
- Video: | Text:

[Video] [Text]

[Delete] [Save] [Cancel]

Rule - Slicing Grip

Identifiers
- Rule Number: 011020
- Rule Name: Slicing Grip

Rule Description
- Question: [Questions...]
- Relation:
- Response:
- Logic:

↑ ↓ [Insert] [Replace] [Remove]

| Question: | Relation: | Response: | Logic: |
|---|---|---|---|
| Start on Target | Equal to | Yes | And |
| Long Shots Worst | Equal to | Yes | And |
| Height of Flight | Equal to | High | Then |

Solution
- Solution Name: Slicing Grip [Solutions...]

[Delete] [Save] [Cancel]

Solution - Slicing Grip — 116

- Identifier
  - Solution Name: Slicing Grip
  - Show
- Description
  - Solution Desc: Solution for Slicing: Proper Grip
- Checklists
  - ↑ ↓ | Insert | Replace | Remove | Checklist
  - Checklists:
    | 1110 | Slicing Grip Negative |
    | 1114 | Slicing Grip Positive |
    | 1116 | Slicing Grip Complete |
- Option
  - ◉ None   ○ Numbered   ○ Bullet Points
- Delete | Save | Cancel

FIG. 19

Checklist - Slicing Grip Positive — 118

- Identifiers
  - Checklist Number: 1114
  - Checklist Name: Slicing Grip Positive
  - Show
- Description
  - Checklist Desc: Swing Elements You Must Emphasize:
- Elements
  - ↑ ↓ | Insert | Replace | Remove | Element...
  - Elements:
    | 10050 | Address |
    | 10075 | Grip with Left Hand |
    | 10100 | Grip with Right Hand |
    | 10185 | Align Square |
    | 10280 | Lighten Grip Pressure |
- Element Text:
- Delete | Save | Cancel Rules Master List Title Name: Personal Pro
Subject Name: Full Swing (FS)

| Question Name | Relationship Operator | Reponse | Logic |
|---|---|---|---|
| Rule: | 005010   Hooking Low Upright | | |
| Solution Name: | Low Upright | | |
| Solution Description: | Solution for Hitting Low, Thin, or Hooking: Swing Straighter and Around | | |
| Start on Target | Equal to | Yes | Or |
| Start Right | Equal to | Yes | And |
| Height of Flight | Equal to | Low | And |
| Occasionally Push | Equal to | Yes | And |
| Tee Shots Best | Equal to | Yes | And |
| Iron Shots Thin | Equal to | Yes | Or |
| Frequency Hit Fat | Equal to | Sometimes | Or |
| Frequency Hit Fat | Equal to | Frequently | Then |
| | | | |
| Rule: | 005015   Hooking Slicing Posture | | |
| Solution Name: | Slicing Posture | | |
| Solution Description: | Solution for Slicing, Hooking, or Hitting Fat or Thin: More Upright Posture | | |
| Start on Target | Equal to | Yes | And |
| Iron Shots Thin | Equal to | Yes | Or |
| Frequency Hit Fat | Equal to | Sometimes | Or |
| Frequency Hit Fat | Equal to | Frequently | Then |
| | | | |
| Rule: | 005030   Hooking Forward Pushing | | |
| Solution Name: | Hooking Forward | | |
| Solution Description: | Solution for Hooking, Hitting Low, or Pushing: Move Ball Forward | | |
| Start Right | Equal to | Yes | And |
| Pushing Short Irons | Equal to | Yes | Or |
| Occasionally Push | Equal to | Yes | And |
| Height of Flight | Equal to | Low | Or |
| Height of Flight | Equal to | Medium | Then |

FIG. 24

Question Dialogs Master List

Title Name: Personal Pro
Subject Name: Full Swing (FS)

| Responses | Image Name | Text Name |
|---|---|---|
| | Also Hooking | |
| | Question Name: Also Hooking | Question Abbreviation: Also Hooking |
| | Question Instruction: Determine if your shots are hooking: | |
| | Question Text: Are your well-hit shots hooking to your left? | |
| No | | |
| Yes | | |
| Not Sure | | |
| | Frequency Hit Fat | |
| | Question Name: Frequency Hit Fat | Question Abbreviation: Frequency Hit Fat |
| | Question Instruction: Observe how often you hit the ball fat: | |
| | Question Text: How often do you hit the ground behind the ball, hitting it fat? | |
| Almost Never | | |
| Sometimes | | |
| Frequently | | |
| Not Sure | | |
| | Handicap Rating | |
| | Question Name: Handicap Rating | Question Abbreviation: Handicap Rating |
| | Question Instruction: Estimate your handicap rating: | |
| | Question Text: What is your handicap rating for eighteen holes? | |
| Zero to Two | | |
| Three to Four | | |
| Five to Six | | |
| Seven to Eight | | |
| Nine to Eleven | | |
| Twelve to Fifteen | | |
| Sixteen to Twenty | | |
| Twenty-One or Over | | |
| Not Sure | | |
| | Height of Flight | |
| | Question Name: Height of Flight | Question Abbreviation: Height of Flight |
| | Question Instruction: Observe the height of your full shots: | |
| | Question Text: How high do your full shots usually fly? | |
| Low | | |

ID: mstrqst

FIG. 25

SYSTEM AND METHOD FOR SHARING OF EXPERT KNOWLEDGE

RELATED APPLICATIONS

The present application claims priority of U.S. Provisional Patent Application Ser. No. 60/156,838, filed Sep. 30, 1999. The contents of which are expressly incorporated herein by reference.

APPENDIX

The attached Appendix I is a part of the present specification and is hereby incorporated into the application by reference.

TECHNICAL FIELD

The present invention relates to the field of computer software. More particularly, the present invention relates to a system which enables an expert to easily share the expert's knowledge electronically without having an understanding of the technical system by which the knowledge is being shared.

BACKGROUND OF THE INVENTION

In the past, experts in many different areas have been unable to quickly and easily share their knowledge electronically with others. This is because the expert also had to be an expert in the medium by which the files are shared. Specifically, to publish complicated hierarchies of documents on the world wide web, such as documents which ask a series of questions to diagnose a problem, one had to be an expert in web technology. The complexity and time-consuming nature of publishing knowledge electronically have prevented much knowledge from being shared electronically or, at least, have prevented it from being shared with any easily navigated structure.

In order to solve this problem the present invention automates the process of creating hierarchical structures of electronic documents. The hierarchical structure allows the knowledge to be presented to a learner in an interesting and easily navigated way. Other features and advantages of the invention will be apparent from the following detailed description taken in conjunction with the drawings.

SUMMARY OF THE INVENTION

The present invention provides a system and method of creating electronic files for solving a problem for a learner from the knowledge of an expert comprising the steps of receiving the expert's knowledge in an area of expertise, providing a template for the electronic files and generating the electronic files from the expert's knowledge and the template.

BRIEF DESCRIPTION OF THE DRAWINGS

FIG. 16 is a display of a question parameter window in accordance with a preferred embodiment of the present invention;

FIG. 17 is a display of a rule parameter window in accordance with a preferred embodiment of the present invention;

FIG. 18 is a display of a solution parameter window in accordance with a preferred embodiment of the present invention;

FIG. 19 is a display of a checklist parameter window in accordance with a preferred embodiment of the present invention;

FIG. 24 is a report of the contents of the database in accordance with a preferred embodiment of the present invention; and, FIG. 25 is a report of the contents of the database in accordance with a preferred embodiment of the present invention.

DETAILED DESCRIPTION OF THE PREFERRED EMBODIMENT

While this invention is susceptible of embodiment in many different forms, there will herein be described in detail a preferred embodiment of the invention with the understanding that the present disclosure is to be considered as an exemplification of the principles of the invention and is not intended to limit the broad aspects of the invention to the embodiment illustrated.

The present invention provides a system and method by which experts in a particular field of knowledge can easily and quickly share their knowledge with others electronically. The system simplifies the process for publishing electronic information by not requiring the expert to have detailed knowledge about the system by which the information is published. In the present embodiment of the invention, the knowledge is provided from an expert to a learner by allowing the learner to diagnose a problem the learner is trying to solve by answering questions about the problem. In this manner the learner is taught the solution to the problem to be solved. By answering questions associated with a particular problem, the learner eventually answers enough questions that the solution can be determined. When the proper solution to the learner's problem is determined, the learner is provided with text, images, hyperlinks, video and/or audio, which provide an explanation of each step of the solution to the learner.

The process of the present invention is based upon the idea of using prefabricated code templates as the driving input. Additionally, the invention utilizes descriptions of assets and controls (explained below) that are stored in a database. During the generation process, the template and the descriptions in the database are automatically integrated into the final output. In its preferred embodiment, the present invention generates applications that result in hypertext markup language ("HTML") and Javascript source code. This creates a World Wide Web look and feel. However, various output formats could be implemented without departing from the principles of the present invention. As such, the present invention should not be limited to HTML and Javascript source code.

Figure 1:
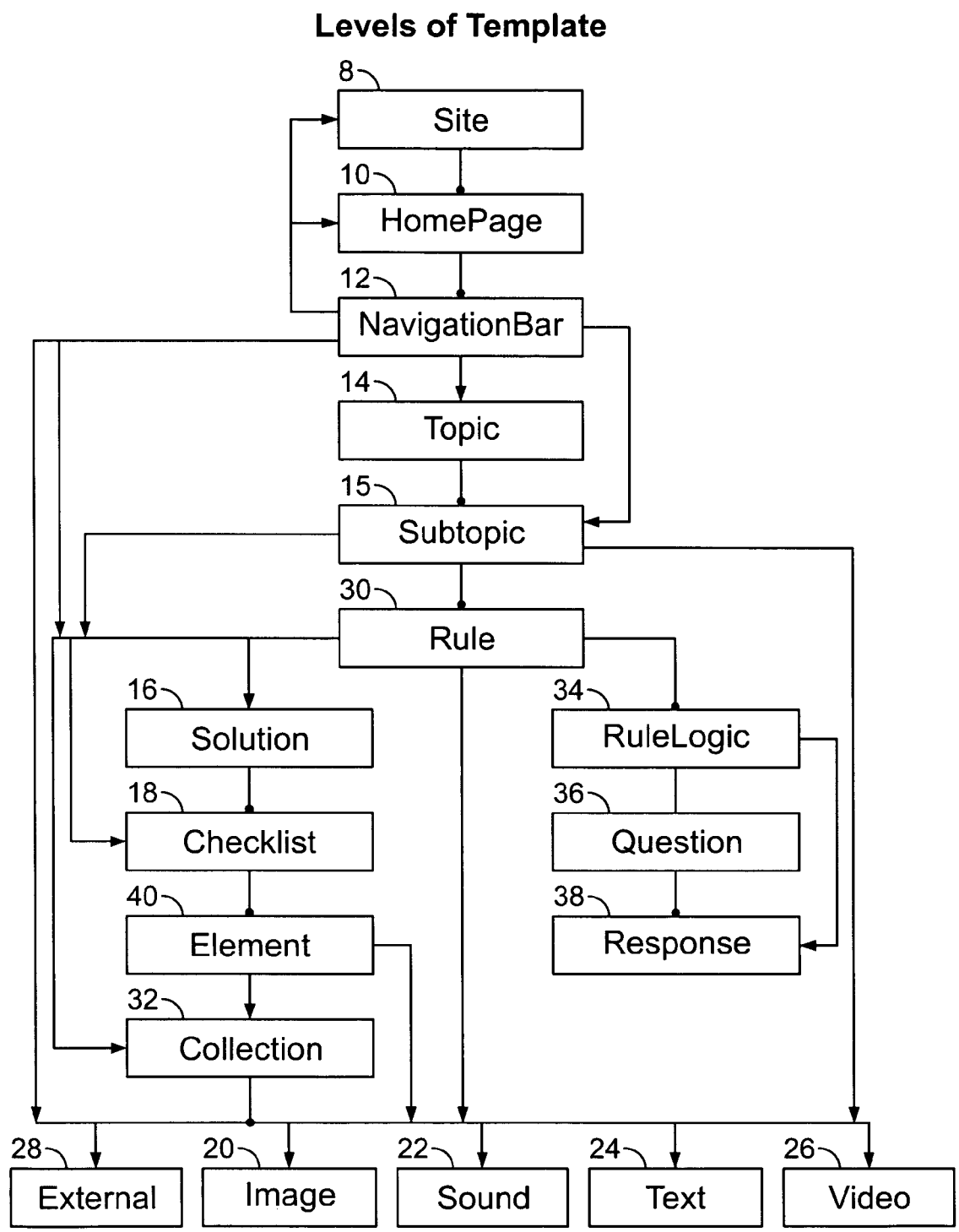
FIG. 1 is a diagram of a template in accordance with the present invention.

In the presently preferred embodiment, the interface for a learner to interact with the present invention is an internet browser which accesses files written in HTML and Javascript. As shown in FIG. 1, the HTML files are generated from a template 2 which incorporates knowledge supplied by the expert. The template 2 comprises a site 8, a home page 10 and a navigation bar 12. The navigation bar 12 can link the learner to topics 14, subtopics 15, solutions 16, checklists 18, or collections 32 of multimedia assets. The multimedia assets may be images 20, sound 22, text 24, video 26 or any combination thereof. The multimedia asset can also be a link to multimedia provided from an external source 28. The present list of multimedia assets is representative rather than comprehensive and can include other technologies such as communication with a live person.

In FIG. 1, relationship between items is shown by a line with an arrowhead or a line with a circle. Items connected by a line with an arrowhead show a relationship between two distinct items. Items connected by a line with a circle indicate a relationship between an item and a second item which is representative of a group of such items.

A learner can also use the navigation bar 12 to navigate to the home page 10 and the site 8. The home page 10 is the highest level of a particular application, i.e. the highest level of a particular area of expertise. The site 8 contains many home pages 10 which represent many areas of expertise.

Topics 14 contain different concepts to be addressed within an area of expertise. Additionally, as indicated by the line and circle relationship of the topic 14 and subtopics 15, topics 14 may have more than one subtopic 15. Subtopics 15 are associated with rules 30, solutions 16, checklists 18 and collections 32. Rules 30 are associated with solutions 16, checklists 18, collections 32, and rulelogics 34. Rulelogics 34 are associated with a question 36 and a response 38. Checklists are associated with elements 40.

Figure 2:
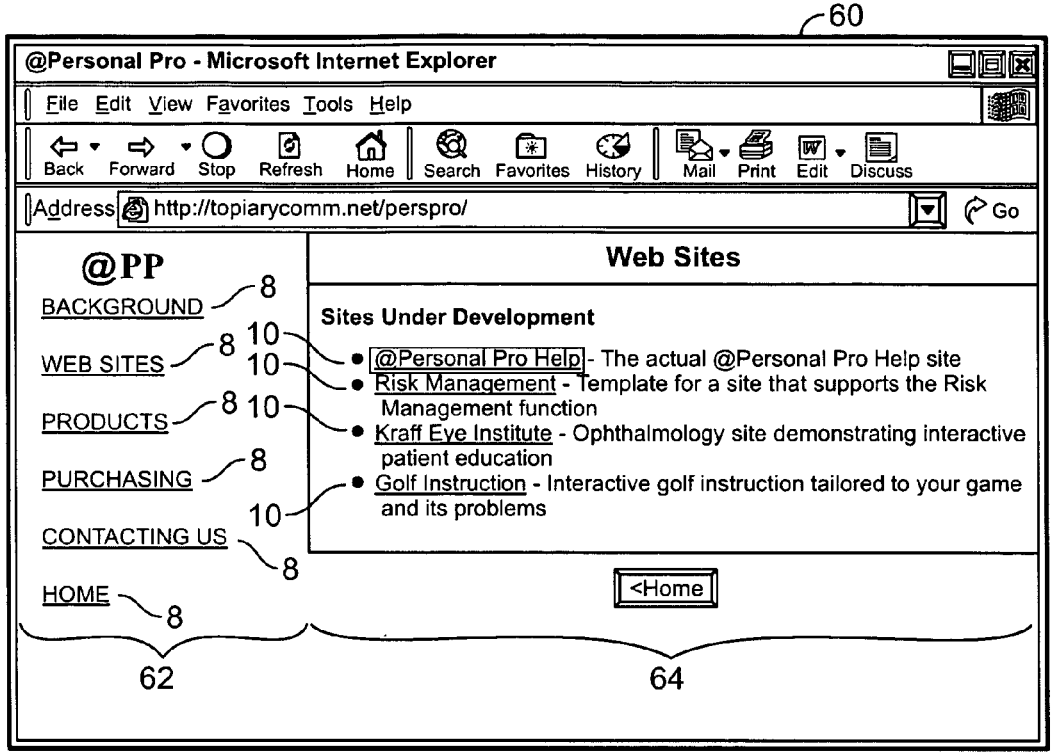
FIG. 2 is a display of a generated HTML file in accordance with a preferred embodiment of the present invention.

By using HTML files which implement the template 2 of FIG. 1, learners can diagnose a problem in order to find a solution. Referring to FIG. 2, the previously discussed concepts will be described by way of example. FIG. 2 provides a web browser 60 with a left pane 62 which displays a navigation bar 12 and right pane 64 which displays a site 8. The site 8 contains links to several home pages 10, and the navigation bar can contain links to other sites 8.

Figure 3:
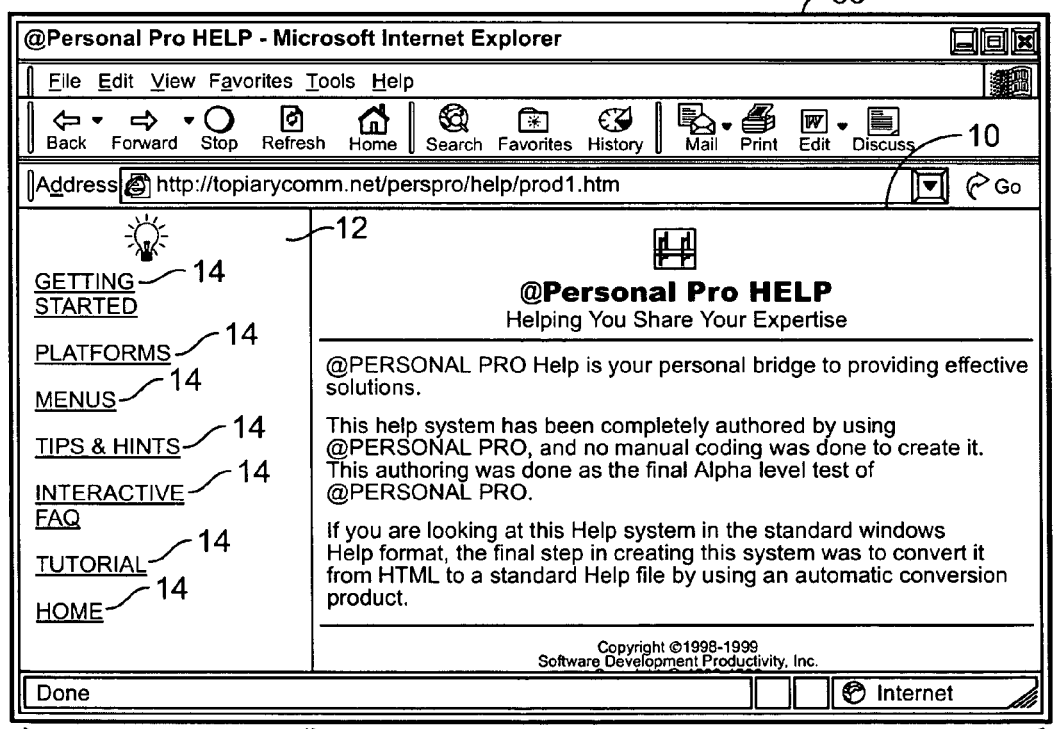
FIG. 3 is a display of a generated HTML file in accordance with a preferred embodiment of the present invention.

By clicking on the home page 10 "@Personal Pro Help" the browser changes to show the navigation bar 12 in the left pane 62 which displays links to topics 14 and displays a homepage 10 associated with the "@Personal Pro" link, as in FIG. 3.

Figure 4:
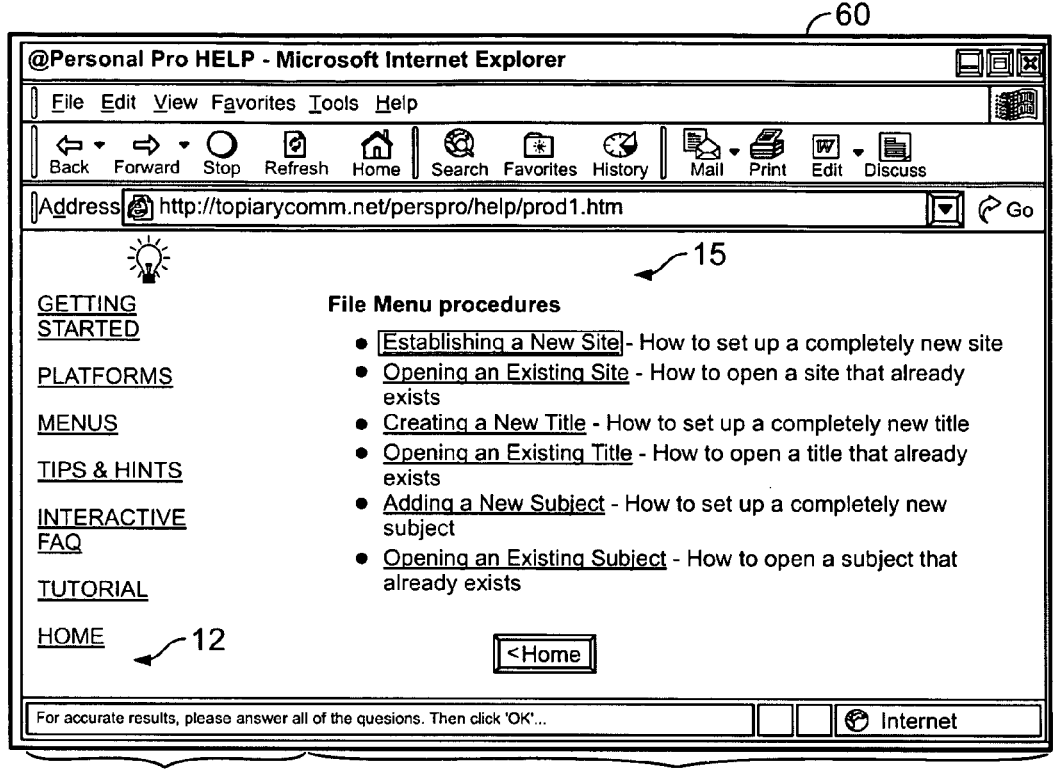
FIG. 4 is a display of a generated HTML file in accordance with a preferred embodiment of the present invention.

By clicking on the topic 14 "Interactive FAQ," the left pane 62 continues to show the topics of FIG. 3, but the right pane 64 changes to show the subtopics 15 associated with the chosen topic 14, as in FIG. 4.

Figure 5:
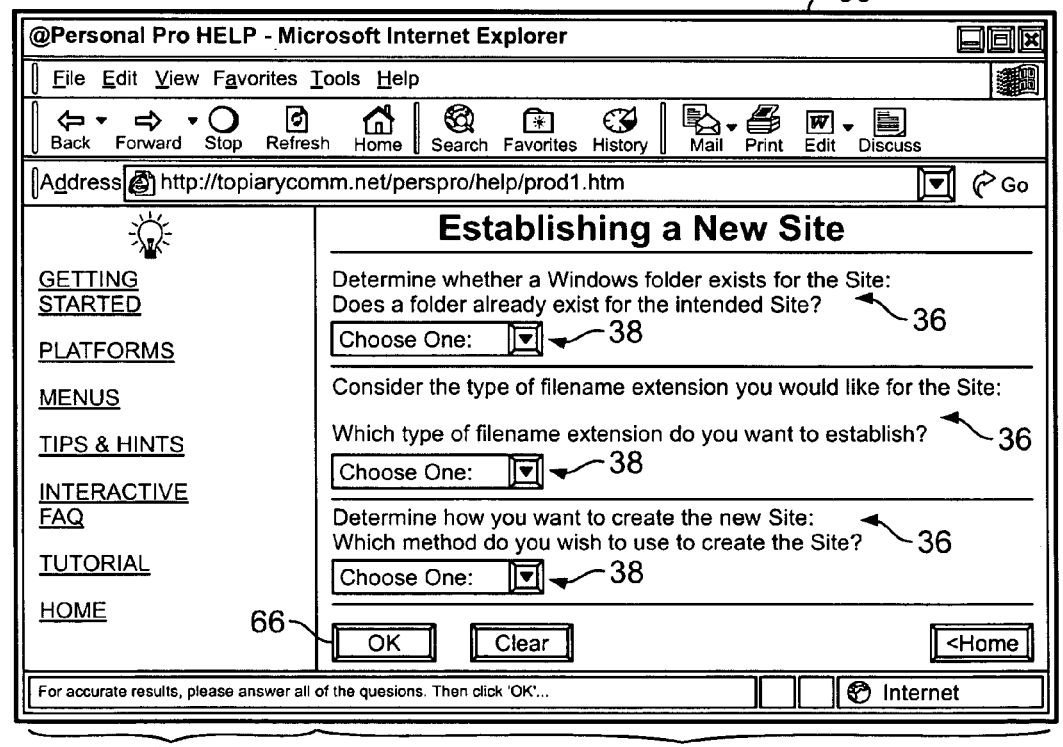
FIG. 5 is a display of a generated HTML file in accordance with a preferred embodiment of the present invention.

By clicking on "Establishing a New Site," which in this case links to a subtopic 15, the left pane 62 continues to display the navigation bar 12 while the right pane 64 displays the question 36 and responses 38, as shown in FIG. 5.

Figure 6:
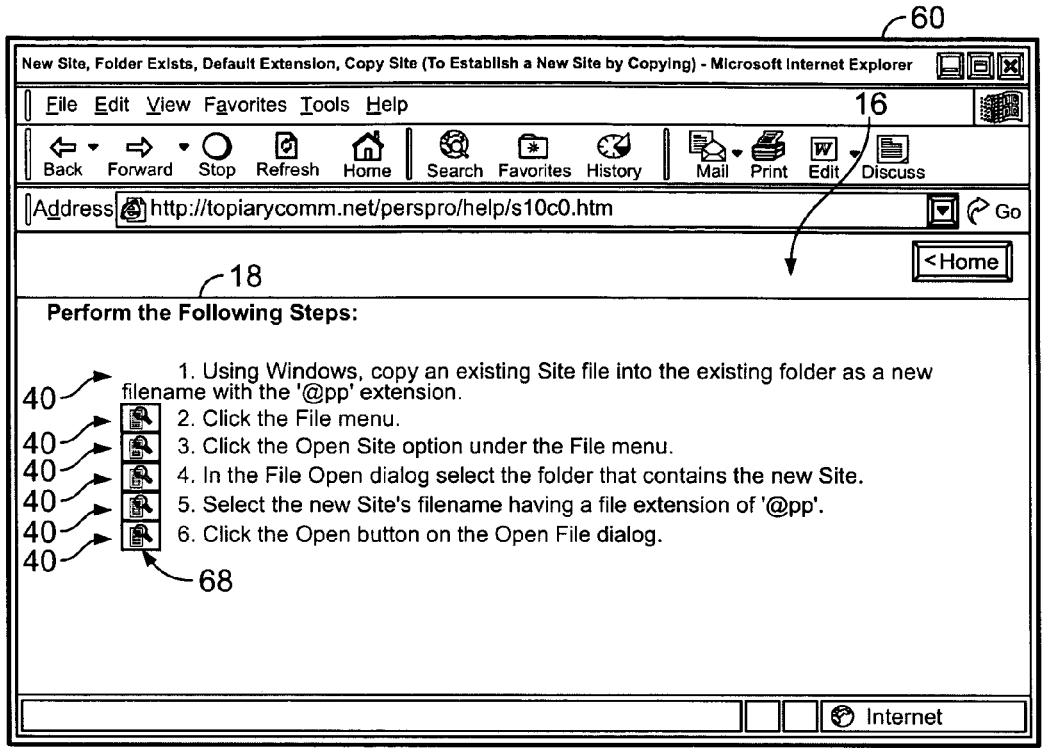
FIG. 6 is a display of a generated HTML file in accordance with a preferred embodiment of the present invention.

After the learner has selected proper responses 38 to the questions 36 and clicks an OK button 66, the rule is executed and the web browser 60 changes to display a solution 16 determined by the rulelogic associated with the rule, as in FIG. 6. The solution 16 comprises a checklist 18 having six elements 40. Associated with elements 60 can be multimedia assets 20, 22, 24, 26, 28 or a collection 32. Collections 32 are simply collections of more than one multimedia asset 20, 22, 24, 26, 28.

Figure 7:
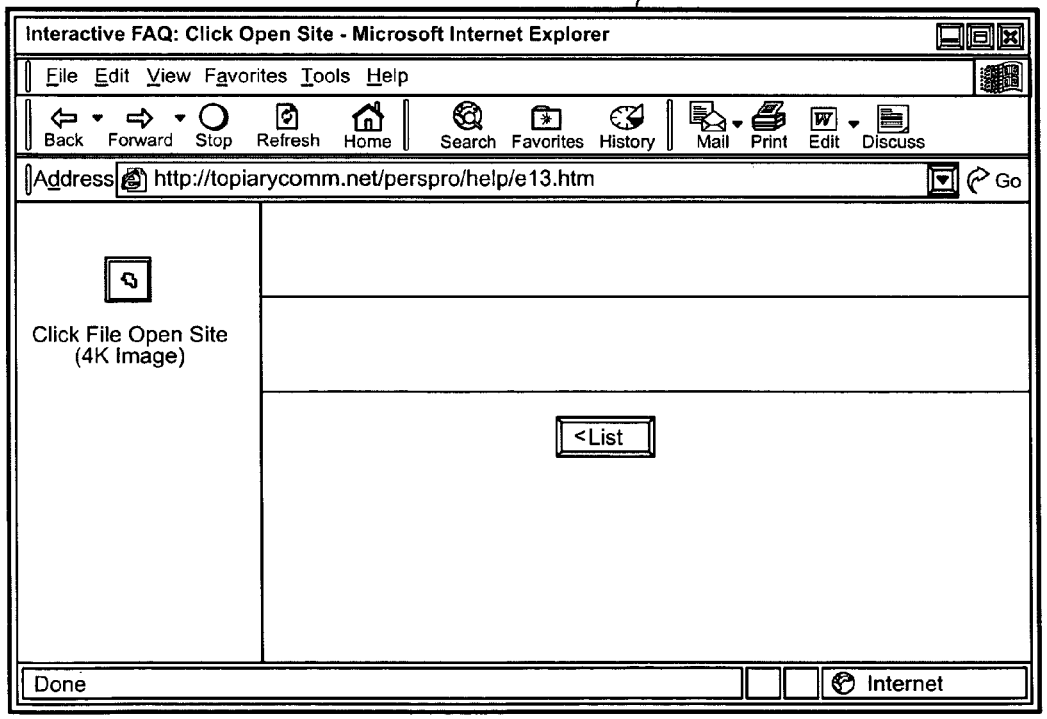
FIG. 7 is a display of a generated HTML file in accordance with a preferred embodiment of the present invention.
Figure 8:
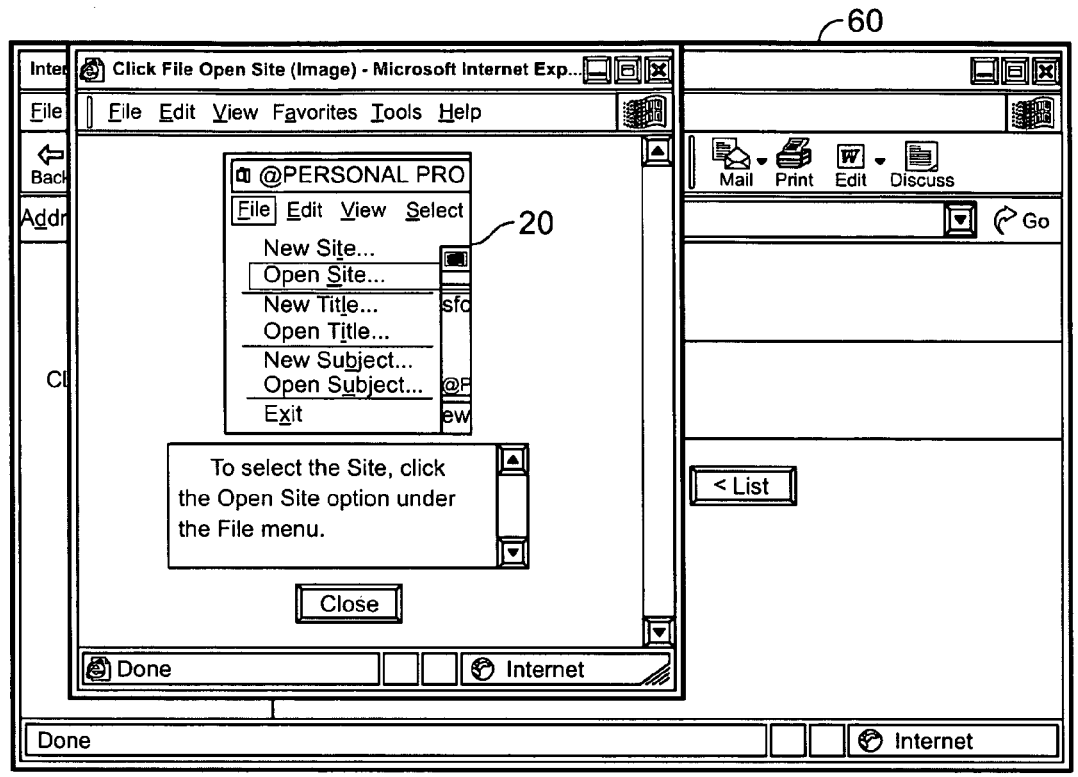
FIG. 8 is a display of a generated HTML file in accordance with a preferred embodiment of the present invention.

By clicking on an indicator 68 next to the element 40, the browser 60 changes to display the asset 20, 22, 24, 26, 28 or collection 32 associated with the element 40, as in FIG. 7. In the case of FIG. 7, an image asset 20 link is shown. By clicking on the image asset 20 link, the image asset 20 is displayed to the learner, as in FIG. 8.

Figure 9:
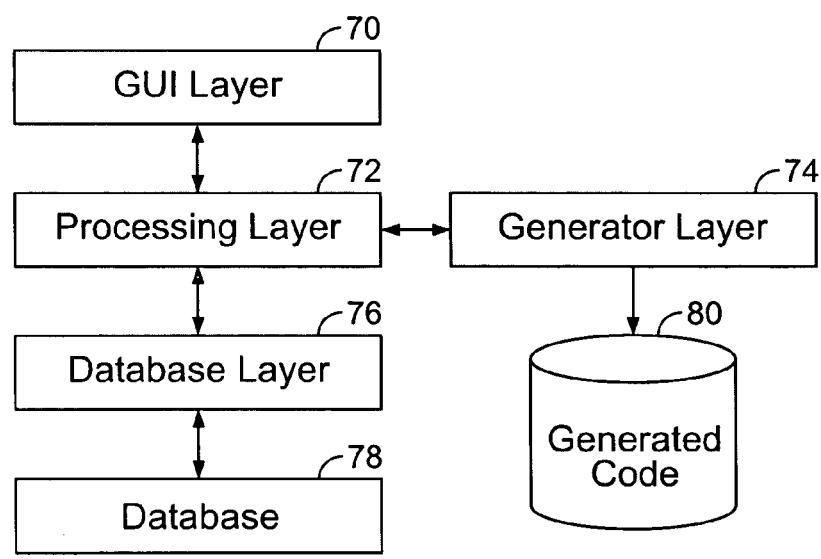
FIG. 9 is a diagram of the hierarchy of a preferred embodiment of the present invention.

Referring to FIG. 9, the present invention uses four distinct layers of processing in order to generate the HTML files from the template 2. The four layers comprise a graphical user interface (GUI) layer 70, a processing layer 72, a generator layer 74 and a database layer 76. Each layer exists as an independent and self-contained object. The GUI layer 70, the generator layer 74, and the database layer 76 each communicate only with and through the processing layer 72. In the preferred embodiment of the present invention, each layer 70–76 operates on a single computer. However, it is contemplated that the four layers 70–76 could be divided among more than one computer in order to distribute processing and utilize geographically remote computers.

The GUI layer's 70 purpose is to prompt input from the expert, pass information to the processing layer 72, and then display updates back to the expert. It communicates with the processing layer 72 to perform validations and other internal processing of the input.

Figure 10:
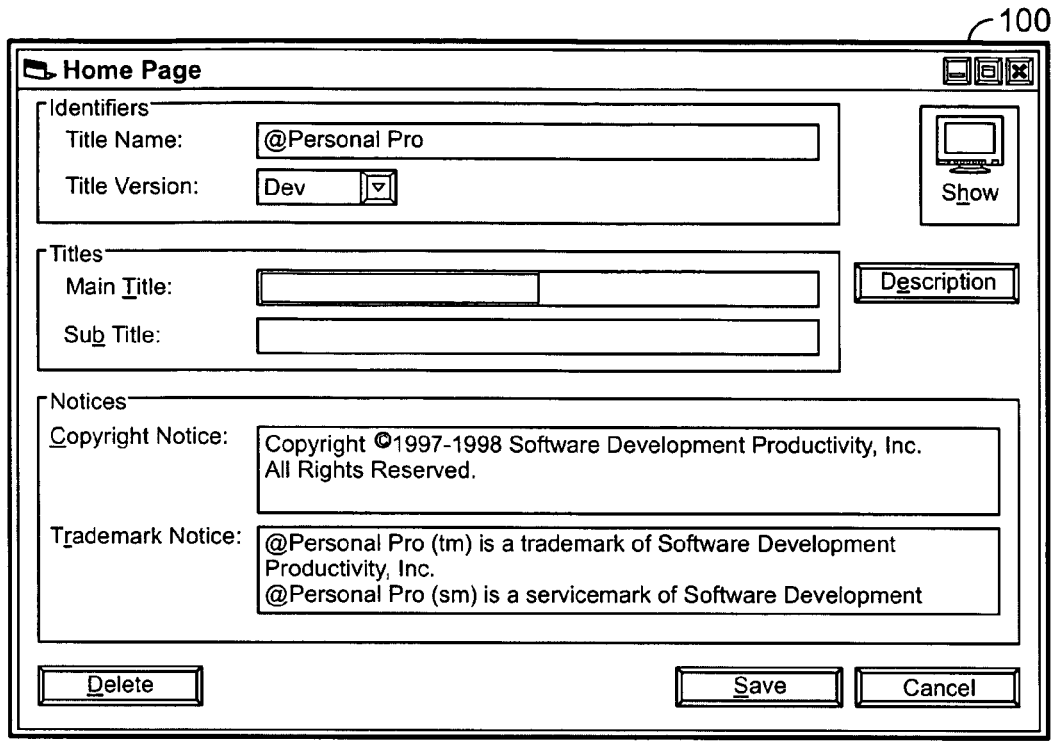
FIG. 10 is a display of a home page parameter window in accordance with a preferred embodiment of the present invention.
Figure 11:
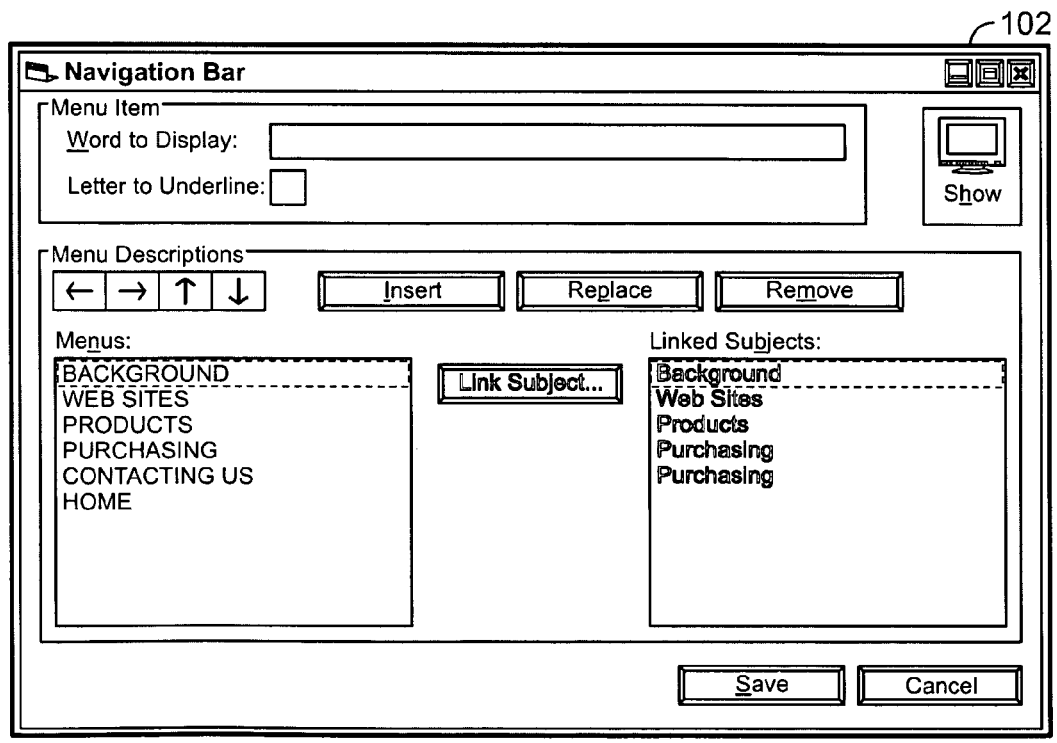
FIG. 11 is a display of a navigation bar parameter window in accordance with a preferred embodiment of the present invention.
Figure 12:
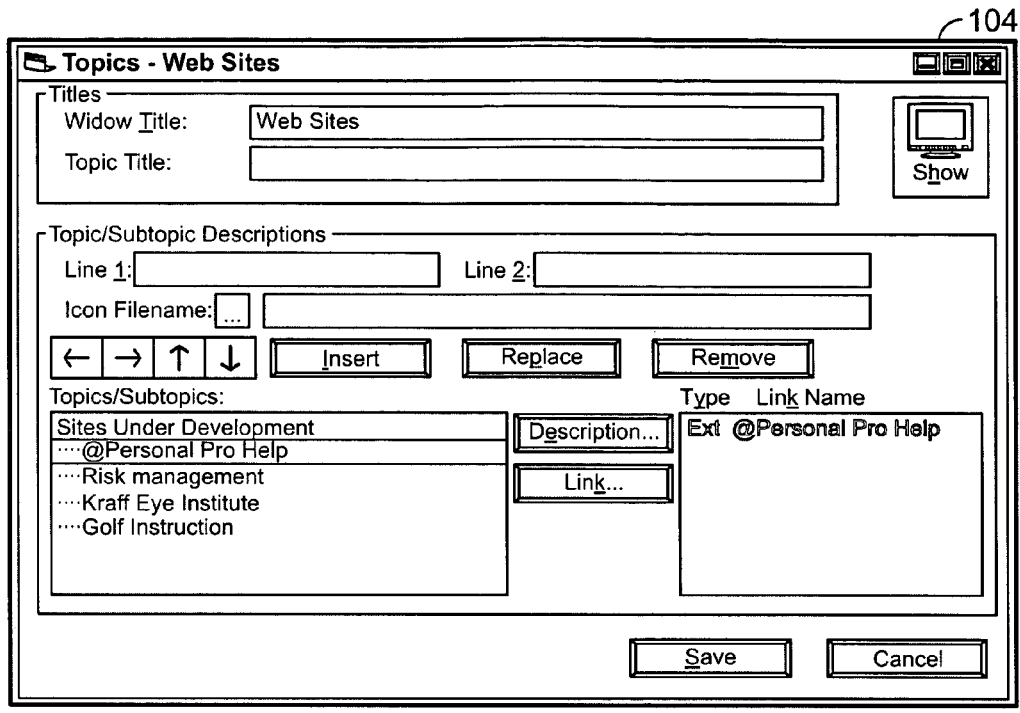
FIG. 12 is a display of a topic parameter window in accordance with a preferred embodiment of the present invention.
Figure 13:
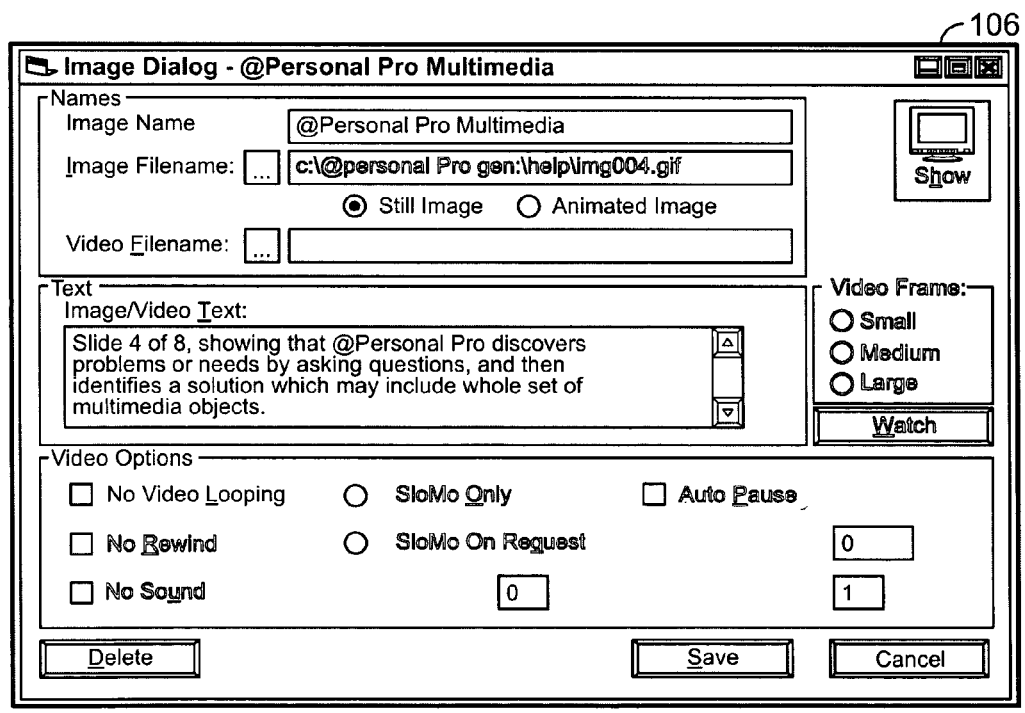
FIG. 13 is a display of an image parameter window in accordance with a preferred embodiment of the present invention.

The GUI layer 70 is the primary interface for enabling the expert to merge knowledge into the template 2. The GUI layer 70 includes multiple dialog boxes which allow the expert to enter parameters for all items associated with the items of the template 2. For example, in FIG. 10, a home page parameter window 100 allows the expert to associate information with a home page including a title name, title version, main title, sub title, copyright notice and trademark notice. In FIG. 11, a navigation bar parameter window 102 allows the expert to associate information with a navigation bar, such as a menu item word to display, a menu item letter to underline, menus and topics to be linked to the menus. In FIG. 12, a topic/subtopic parameter window 104 allows the expert to associate information with topic and subtopics, such as a window title, topic title, line 1 of the topic, line 2 of the topic, icon filename for the topic, a list of topics and subtopics, and a linked item to the topic/subtopic. In FIG. 13, an image or video asset parameter window 106 allows the expert to associate a multimedia asset with the template 2 by allowing the expert to associate an image name, an image filename, still image/animated image radio button, a video filename, an image/video text caption, as well as options related to the type of video used.

Figure 14:
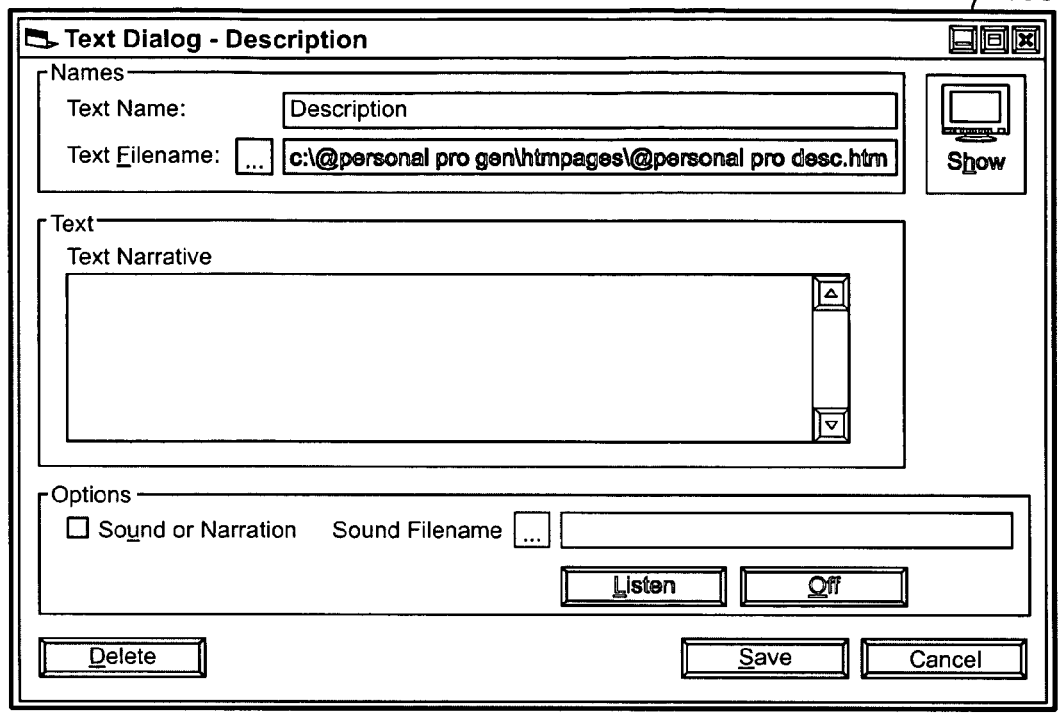
FIG. 14 is a display of a text parameter window in accordance with a preferred embodiment of the present invention.
Figure 15:
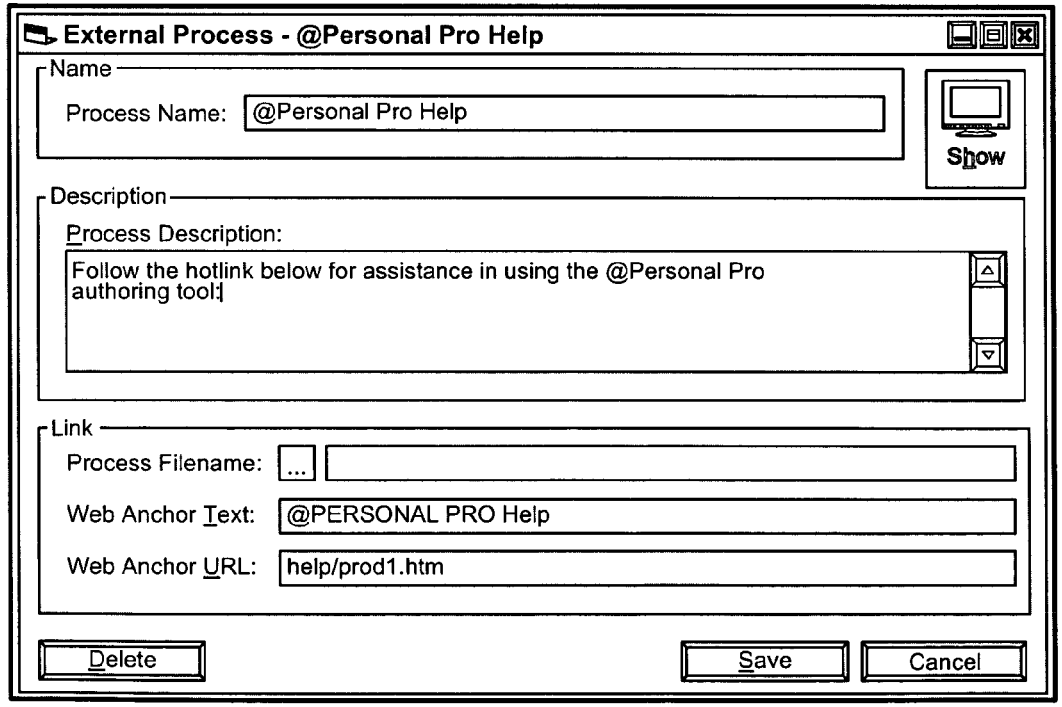
FIG. 15 is a display of a external process parameter window in accordance with a preferred embodiment of the present invention.

In FIG. 14, a text or sound multimedia asset parameter window 108 allows the expert to associate information with a text or sound multimedia asset, such as text name, text filename, text narrative, sound or narration check box, or sound filename. In FIG. 15, an external multimedia type parameter window 110 allows the expert to associate information with an external multimedia asset, such as a process name, process description, process filename, web anchor text, and web anchor URL. In FIG. 16, a question and response parameter window 112 allows the expert to associate information with a question, such as a question name, a question abbreviation, instruction text, question text, response text, and response order.

Figure 20:
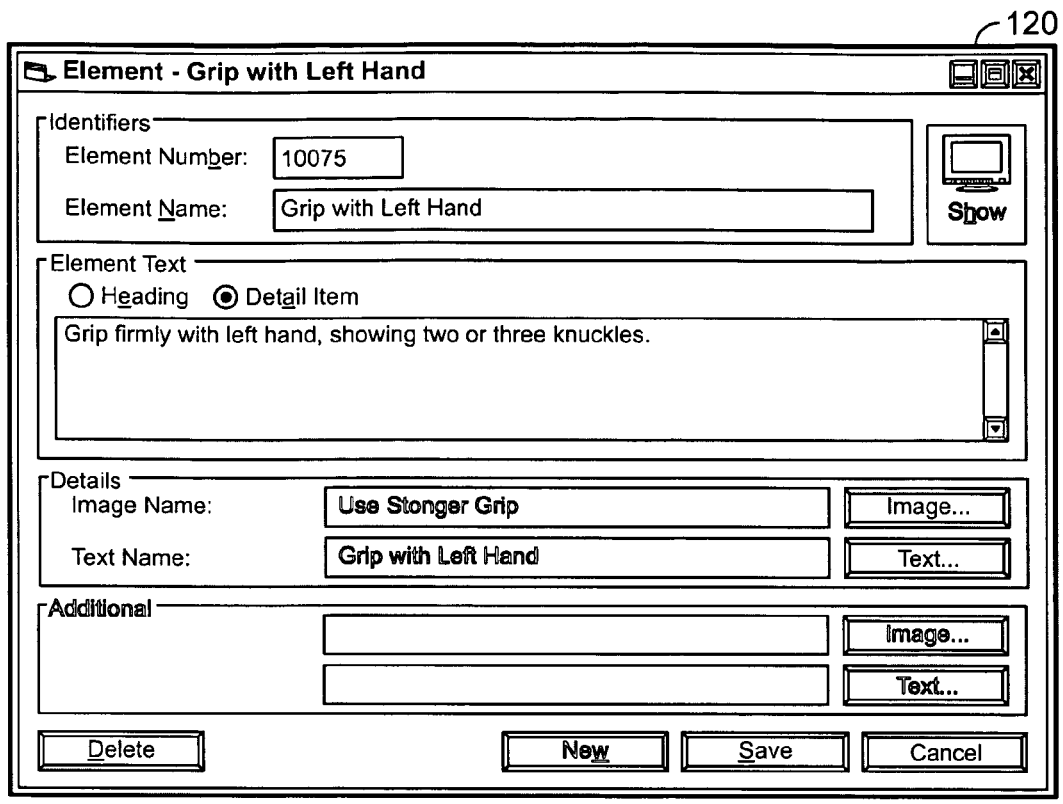
FIG. 20 is a display of an element parameter window in accordance with a preferred embodiment of the present invention.
Figure 21:
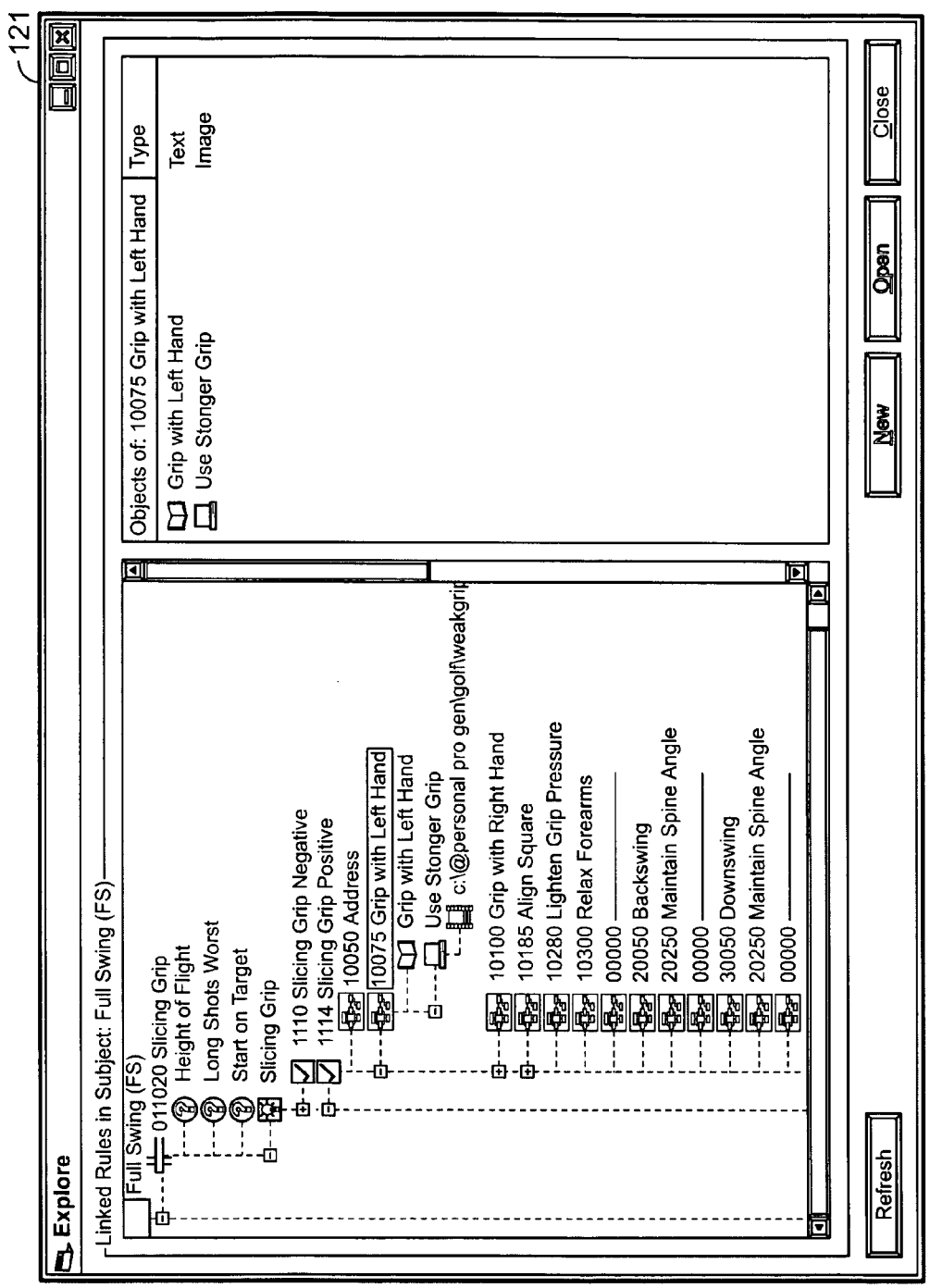
FIG. 21 is a display of a window which shows all of the items in the template in accordance with a preferred embodiment of the present invention.

In FIG. 17, a rule parameter window 114 allows the expert to associate information with a rule, such as a rule number, rule name, a question, a relation, a rule, a rule logic, and a solution name. In FIG. 18, a solution parameter window 116 allows the expert to associate information with a solution, such solution name, solution description, a solution checklist, and a solution presentation style. In FIG. 19, a checklist parameter window 118 allows the expert to associate information with a checklist, such as checklist number, checklist name, checklist description, checklist elements, and checklist element text. In FIG. 20, an element parameter window 120 allows the expert to associate information with an element, such as an element number, an element name, an element text, and element details. In FIG. 21, there is provided a window which shows all items in the template 2 in an explorer-style dialog.

Figure 22:
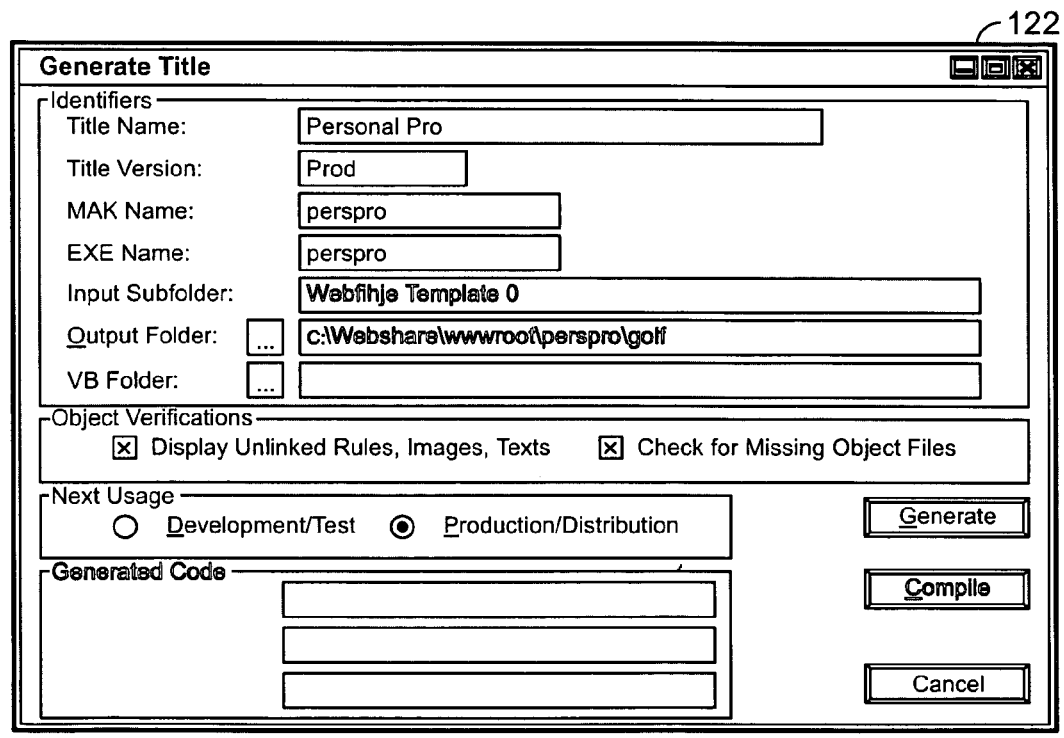
FIG. 22 is a display of a generate window in accordance with a preferred embodiment of the present invention.

In FIG. 22, a generate HTML page window 122 is provided. From this window, an expert may assign a title name, title version, MAK Name, EXE Name, input subfolder, output folder, VB folder, object verifications checkboxes, next usage radio buttons, and a generate command box. When the expert clicks the generate command box, the information provided by the expert through the previously discussed windows is passed to the processing layer 72.

The processing layer 72 receives requests from the GUI layer 70 and the generator layer 74, requests information from a database 78 via the database layer 76, and returns information to the GUI layer 70 and the generator layer 74. It also receives information from the GUI layer 70 and performs validations of data and other internal processing, and inputs the data to the database 78 via the database layer 76.

The generator layer 74 automatically creates the HTML and Javascript files 80. It requests information from the database 78 via the processing layer 72 and the database layer 76, uses template files 2 as additional input, and processes the HTML and Javascript files 80. As the processing begins, the generator determines the template 2 to be used.

Each template is processed independently and in turn references a specific asset type whose descriptive information needs to be accessed in the database for that template. At a deeper level, each template also contains control types that call for specific types of source code to be generated at each of their respective locations in the template. Templates also contain references to text files that contain static, common source code that needs to be generated into their locations as well.

At the most detailed level, as the different control types are being generated, their related properties, stored in the control detail database table, determine specific source code instructions to generate. Some examples of these types of properties include font sizes, font styles, alignments, colors, sizes of images, and web page URLs to link to.

Defaults for the properties of the various control types can be defined by the authoring process and stored in the control default database table. The generator responds to the default values by automatically generating cascading style sheets that in turn are referenced by the generated web pages. This creates a consistent look-and-feel for the same control types that may appear in more than one template.

As the code is being generated it is placed in a location indicated by the author's choices stored in the home page directory database table. Also, at the author's option, a history can be maintained of which output files have changed since the previous generation process has been run for that template group.

Figure 23A:
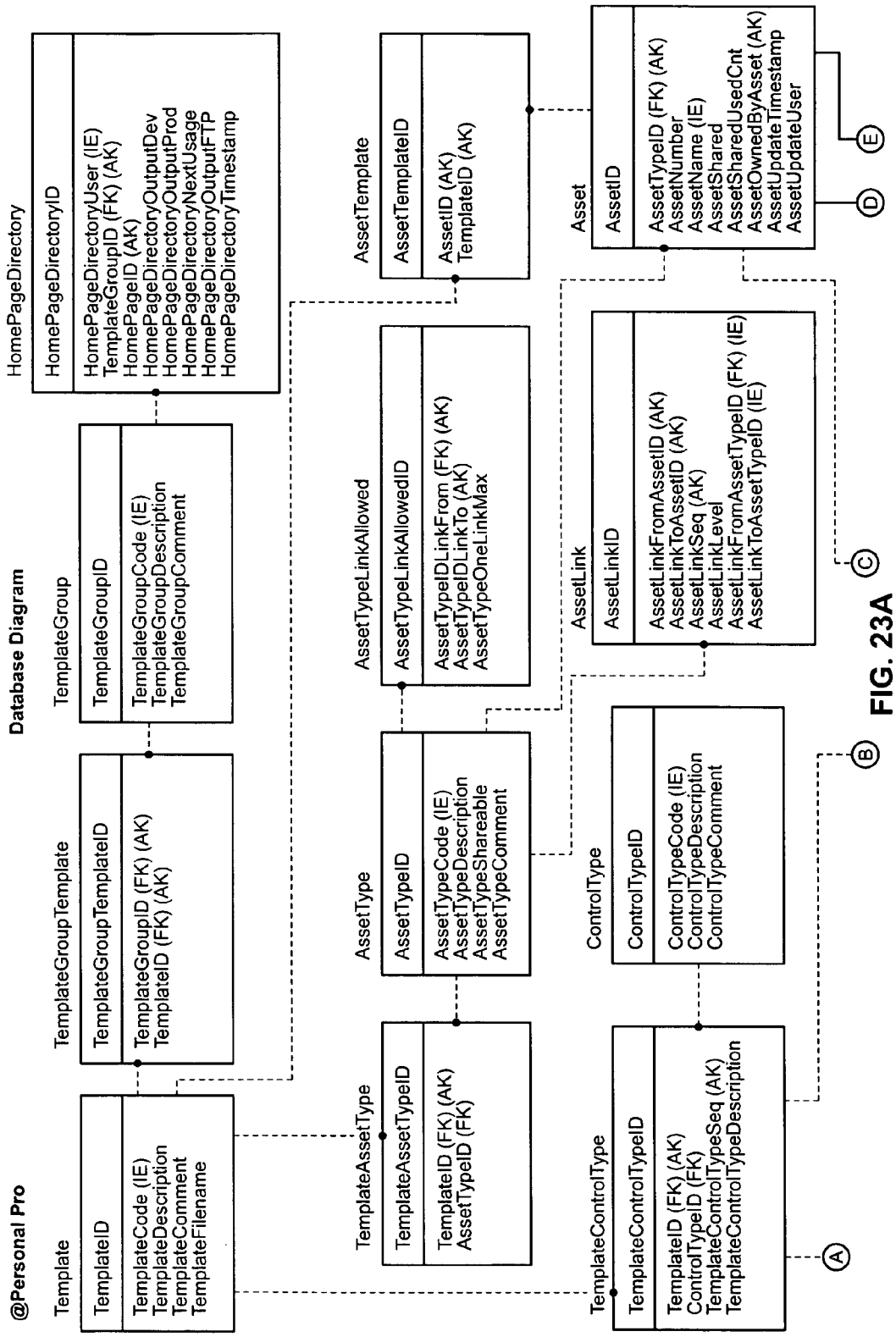
FIG. 23 is a diagram of the database in accordance with a preferred embodiment of the present invention.
Figure 23B:
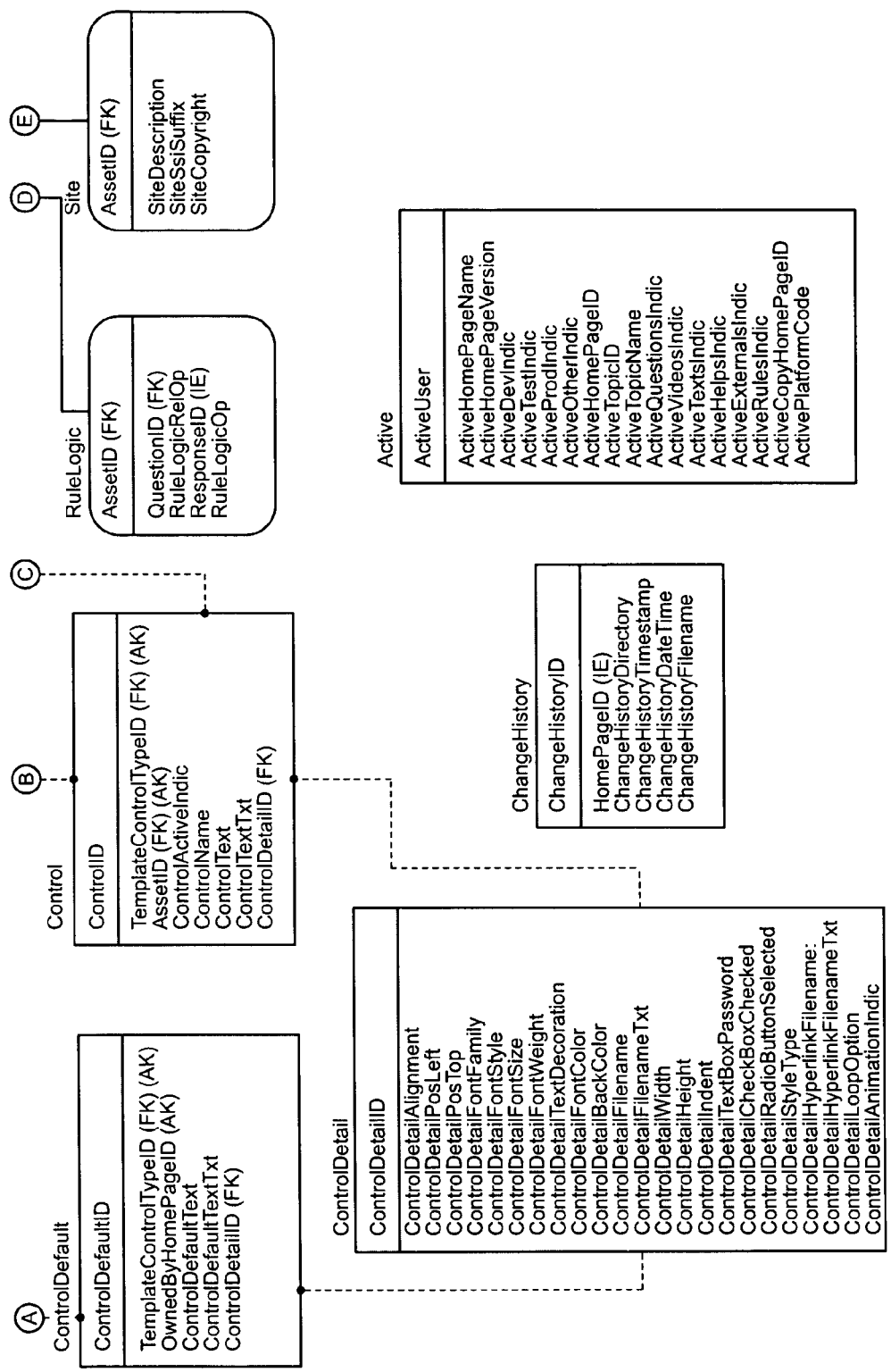

The database layer 76 interfaces directly with the database. The database typically comprises a database management system, such as Oracle, SQL or Microsoft Access. It receives requests for information, input data and instructions from the processing layer 72. The database layer 76 is the only layer that needs to be aware of the specific database management system being implemented. Referring to FIG. 23, the database is constructed using multiple linked tables, as shown, the construction of such database is shown in Appendix I.

The present invention is capable printing reports to the expert which display the properties of every item within the database. Referring to FIG. 24, there is shown a report for showing all of the rulelogic associated with each individual rule. In FIG. 25, there is shown a report showing the questions within the database and the responses associated with each question.

Finally, while the preferred embodiment of the present invention is a locally executed application, it is further contemplated that the GUI layer 70 could be implemented to communicate to an expert via a web page rather than as a locally executed program. In such an embodiment, the layers 70–76, database 78 and HTML files 80 would exist on one or more web servers which communicate with the expert through the Internet and a web browser. Additionally, either embodiment could further implement a step of automatically publishing the HTML files to a web server connected to the Internet.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

What is claimed is:

1. A method of authoring, generating, and using a compliance application having a plurality of pages viewable with an interface, the compliance application interacting with a user to find a solution to a problem through the user answering a series of questions and/or following a series of steps, the method comprising the steps of:

receiving a first question, a second question, and a third question from an expert, wherein none of the first, second, and third questions have an answer which is incorrect;

receiving a first potential answer to the first question and a second potential answer to the first question from the expert, wherein both the first and second potential answers to the first question are correct answers to the first question, and wherein the first and second answers are utilized in a non-dynamic and pre-populated manner to create a compliance path;

receiving a first potential answer to the second question and a second potential answer to the second question from the expert, wherein both the first and second potential answers to the second question are correct answers to the second question, and wherein the first and second answers are utilized in a non-dynamic and pre-populated manner to create the compliance path;

receiving a solution to the problem from the expert, the solution being an answer and/or a step for the user to follow for use in the compliance application;

receiving a first Boolean logic rule from the expert, the first Boolean logic rule associating the first potential answer to the first question, the first potential answer to the second question, and the third question, the first Boolean logic rule being utilized within the compliance application for directing the user through the compliance path for complying with the compliance application;

receiving a second Boolean logic rule from the expert, the second Boolean logic rule associating the first potential answer to the first question, the second potential answer to the second question, and the solution, the second Boolean logic rule being utilized within the compliance application for directing the user through the compliance path for complying with the compliance application;

generating the plurality of pages based on the first question, the second question, the third question, the first potential answer to the first question, the second potential answer to the first question, the first potential answer to the second question, the second potential answer to the second question, the first Boolean logic rule, the second Boolean logic rule, and the solution;

transmitting a first page of the plurality of pages to the user, the first page displaying the first question to the user;

receiving a first response from the user, wherein the first response is indicative of one of the first potential answer to the first question and the second potential answer to the first question, wherein if the first response is in correct syntax, the first response will always be correct, and wherein at least one of the first and second potential answers to the first question will match the first response and lead to a further step within the compliance path or to the solution within the compliance path;

transmitting a second page of the plurality of pages to the user, the second page displaying the second question to the user as a part of the further step within the compliance path;

receiving a second response from the user, wherein the second response is indicative of one of the first potential answer to the second question and the second potential answer to the second question, wherein if the second response is in correct syntax, the second response will always be correct, and wherein at least one of the first and second potential answers to the second question will match the second response and lead to a further step within the compliance path or to the solution within the compliance path;

executing at least one of the first Boolean logic rule to produce a first rule result which is indicative of the next step in the compliance path, and the second Boolean logic rule to produce a second rule result, which may also be indicative of the next step in the compliance path or may be indicative of the even further step within the compliance path; and transmitting a third page to the user, the third page displaying the third question to the user if the first rule result is positive as the next step in the compliance path, the second page displaying the further step in the compliance path or the solution to the user if the second rule result is positive.

2. A method as defined in claim 1, further comprising automatically publishing the plurality of pages to a server connected to the Internet.

3. A method as defined in claim 1, wherein generating the plurality of pages comprises generating HTML files.

4. A method as defined in claim 3, wherein generating the plurality of pages comprises generating JavaScript.

5. A method as defined in claim 4, wherein generating the plurality of pages comprises generating cascading style sheets.

6. A method as defined in claim 1, wherein generating the plurality of pages comprises using a template.

7. A method as defined in claim 6, wherein the template includes source code.

8. A method as defined in claim 1, wherein the solution comprises text.

9. A method as defined in claim 1, wherein the solution comprises a multimedia asset.

10. A method as defined in claim 9, wherein the multimedia asset comprises at least one of a sound multimedia asset, a video multimedia asset, an image multimedia asset, and/or a web page.

11. A method as defined in claim 9, wherein the multimedia asset comprises communication with a live person.

12. A computer readable medium storing instructions structured to facilitate authoring, generating, and using a compliance application having a plurality of pages viewable with an interface, the compliance application interacting with a user to find a solution to a problem through the user answering a series of questions and/or following a series of steps, the instructions being structured to cause a computer to:

receive a first question, a second question, and a third question from an expert, wherein none of the first, second, and third questions have an answer which is incorrect;

receive a first potential answer to the first question and a second potential answer to the first question from the expert, wherein both the first and second potential answers to the first question are correct answers to the first question, and wherein the first and second answers are utilized in a non-dynamic and pre-populated manner to create a compliance path;

receive a first potential answer to the second question and a second potential answer to the second question from the expert, wherein both the first and second potential answers to the second question are correct answers to the second question, and wherein the first and second answers are utilized in a non-dynamic and pre-populated manner to create the compliance path;

receive a solution to the problem from the expert, the solution being an answer and/or a step for the user to follow for use in the compliance application;

receive a first Boolean logic rule from the expert, the first Boolean logic rule associating the first potential answer to the first question, the first potential answer to the second question, and the third question, the first Boolean logic rule being utilized by the compliance system for directing the user through the compliance path for complying with the compliance application;

receive a second Boolean logic rule from the expert, the second Boolean logic rule associating the first potential answer to the first question, the second potential answer to the second question, and the solution, the second Boolean logic rule being utilized within the compliance application for directing the user through the compliance path for complying with the compliance application;

generate the plurality of pages based on the first question, the second question, the third question, the first potential answer to the first question, the second potential answer to the first question, the first potential answer to the second question, the second potential answer to the second question, the first Boolean logic rule, the second Boolean logic rule, and the solution;

transmit a first page of the plurality of pages to the user, the first page displaying the first question to the user;

receive a first response from the user, wherein the first response is indicative of one of the first potential answer to the first question and the second potential answer to the first question, wherein if the first response is in correct syntax, the first response will always be correct, and wherein at least one of the first and second potential answers to the first question will match the first response and lead to a further step within the compliance path or to the solution within the compliance path;

transmit a second page of the plurality of pages to the user, the second page displaying the second question to the user as a part of the further step within the compliance path;

receive a second response from the user, wherein the second response is indicative of one of the first potential answer to the second question and the second potential answer to the second question, wherein if the second response is in correct syntax, the second response will always be correct, and wherein at least one of the first and second potential answers to the second question will match the second response and lead to a further step within the compliance path or to the solution within the compliance path;

execute at least one of the first Boolean logic rule to produce a first rule result which is indicative of the next step in the compliance path, and the second Boolean logic rule to produce a second rule result, which may also be indicative of the next step in the compliance path or may be indicative of the even further step within the compliance path; and transmit a third page to the user, the third page displaying the third question to the user if the first rule result is positive as the next step in the compliance path, the second page displaying the further step in the compliance path or the solution to the user if the second rule result is positive.

13. A computer readable medium as defined in claim 12, wherein the instructions are structured to cause the computer to automatically publish the plurality of pages to a server connected to the Internet.

14. A computer readable medium as defined in claim 12, wherein the instructions are structured to cause the computer to generate the plurality of pages as HTML files.

15. A computer readable medium as defined in claim 14, wherein the instructions are structured to cause the computer to include JavaScript in the HTML files.

16. A computer readable medium as defined in claim 15, wherein the instructions are structured to cause the computer to generate the plurality of pages with cascading style sheets.

17. A computer readable medium as defined in claim 12, wherein the instructions are structured to cause the computer to generate the plurality of pages using a template.

18. A computer readable medium as defined in claim 17, wherein the template includes source code.

19. A computer readable medium as defined in claim 12, wherein the solution comprises text.

20. A computer readable medium as defined in claim 12, wherein the solution comprises a multimedia asset.

21. A computer readable medium as defined in claim 20, wherein the multimedia asset comprises at least one of a sound multimedia asset, a video multimedia asset, an image multimedia asset, and/or a web page.

22. A computer readable medium as defined in claim 20, wherein the multimedia asset comprises communication with a live person.

23. An apparatus structured to facilitate authoring, generating, and using a compliance application having a plurality of pages viewable with an interface, the compliance application interacting with a user to find a solution to a problem through the user answering a series of questions and/or following a series of steps, the apparatus being structured to:

receive a first question, a second question, and a third question from an expert, wherein none of the first, second, and third questions have an answer which is incorrect;

receive a first potential answer to the first question and a second potential answer to the first question from the expert, wherein both the first and second potential answers to the first question are correct answers to the first question, and wherein the first and second answers are utilized in a non-dynamic and pre-populated manner to create a compliance path;

receive a first potential answer to the second question and a second potential answer to the second question from the expert, wherein both the first and second potential answers to the second question are correct answers to the second question, and wherein the first and second answers are utilized in a non-dynamic and pre-populated manner to create the compliance path;

receive a solution to the problem from the expert, the solution being an answer and/or a step for the user to follow for use in the compliance application;

receive a first Boolean logic rule from the expert, the first Boolean logic rule associating the first potential answer to the first question, the first potential answer to the second question, and the third question, the first Boolean logic rule being utilized by the compliance system for directing the user through the compliance path for complying with the compliance application;

receive a second Boolean logic rule from the expert, the second Boolean logic rule associating the first potential answer to the first question, the second potential answer to the second question, and the solution, the second Boolean logic rule being utilized within the compliance application for directing the user through the compliance path for complying with the compliance application;

generate the plurality of pages based on the first question, the second question, the third question, the first potential answer to the first question, the second potential answer to the first question, the first potential answer to the second question, the second potential answer to the second question, the first Boolean logic rule, the second Boolean logic rule, and the solution;

transmit a first page of the plurality of pages to the user, the first page displaying the first question to the user;

receive a first response from the user, wherein the first response is indicative of one of the first potential answer to the first question and the second potential answer to the first question, wherein if the first response is in correct syntax, the first response will always be correct, and wherein at least one of the first and second potential answers to the first question will match the first response and lead to a further step within the compliance path or to the solution within the compliance path;

transmit a second page of the plurality of pages to the user, the second page displaying the second question to the user as a part of the further step within the compliance path;

receive a second response from the user, wherein the second response is indicative of one of the first potential answer to the second question and the second potential answer to the second question, wherein if the second response is in correct syntax, the second response will always be correct, and wherein at least one of the first and second potential answers to the second question will match the second response and lead to a further step within the compliance path or to the solution within the compliance path;

execute at least one of the first Boolean logic rule to produce a first rule result which is indicative of the next step in the compliance path, and the second Boolean logic rule to produce a second rule result, which may also be indicative of the next step in the compliance path or may be indicative of the even further step within the compliance path; and transmit a third page to the user, the third page displaying the third question to the user if the first rule result is positive as the next step in the compliance path, the second page displaying the further step in the compliance path or the solution to the user if the second rule result is positive.

24. An apparatus as defined in claim 23, further structured to automatically publish the plurality of pages to a server connected to the Internet.

25. An apparatus as defined in claim 23, further structured to generate the plurality of pages as HTML files.

26. An apparatus as defined in claim 25, further structured to include JavaScript in the HTML files.

27. An apparatus as defined in claim 26, further structured to generate the plurality of pages with cascading style sheets.

28. An apparatus as defined in claim 23, further structured to generate the plurality of pages using a template.

29. An apparatus as defined in claim 28, wherein the template includes source code.

30. An apparatus as defined in claim 23, wherein the solution comprises text.

31. An apparatus as defined in claim 23, wherein the solution comprises a multimedia asset.

32. An apparatus as defined in claim 31, wherein the multimedia asset comprises at least one of a sound multimedia asset, a video multimedia asset, an image multimedia asset, and/or a web page.

33. An apparatus as defined in claim 31, wherein the multimedia asset comprises communication with a live person.

* * * * *